US006167504A

United States Patent [19]
Damron

[11] Patent Number: 6,167,504
[45] Date of Patent: Dec. 26, 2000

[54] METHOD, APPARATUS AND COMPUTER PROGRAM PRODUCT FOR PROCESSING STACK RELATED EXCEPTION TRAPS

[75] Inventor: Peter C. Damron, Fremont, Calif.

[73] Assignee: Sun Microsystems, Inc., Palo Alto, Calif.

[21] Appl. No.: 09/122,172

[22] Filed: Jul. 24, 1998

[51] Int. Cl.[7] .................................................. G06F 11/36
[52] U.S. Cl. .......................................... 712/202; 711/204
[58] Field of Search .............................. 712/202; 711/204

[56] References Cited

U.S. PATENT DOCUMENTS

| | | | |
|---|---|---|---|
| 5,050,067 | 9/1991 | McLagan | 709/108 |
| 5,107,457 | 4/1992 | Hayes | 711/132 |
| 5,233,691 | 8/1993 | Ando et al. | 395/250 |
| 5,388,235 | 2/1995 | Ikenaga et al. | 395/375 |
| 5,832,289 | 11/1998 | Shaw | 712/30 |
| 6,006,323 | 12/1999 | Ma et al. | 712/202 |

FOREIGN PATENT DOCUMENTS 2 273 186  6/1994  United Kingdom .

OTHER PUBLICATIONS

"Floating–Point Unit," *Intel Architecture Software Developer's Manual—vol. 1: Basic Architecture*. Illinois: Intel Corporation. 7–1 to 7–55 (1997).

Hayes, J.R. et al., "An Architecture for the Direct Execution of the Forth Programming Language," *Computer Architecture News*. 15: (05) 42–49 (1987).

*The SPARC Architecture Manual*. Eds. David L. Weaver and Tom Germond. New Jersey: PTR Prentice Hall 8–14, 20–21, 30–39, 56–59, 78–83, 102–103, 148–149, 166–149, 166–167, 170–171, 212–217, 290–309.

*Primary Examiner*—Eric Coleman
*Attorney, Agent, or Firm*—Daniel B. Curtis

[57] ABSTRACT

Apparatus, methods, and computer program products are disclosed that improve the operation of a computer that uses a top-of-stack cache by reducing the number of overflow and underflow traps generated during the execution of a program. The invention maintains a predictor value that controls the number of stack elements that are spilled from, or filled to, the top-of-stack cache in response to an overflow trap or an underflow trap (respectively). The predictor reflects the history of overflow traps and underflow traps.

35 Claims, 8 Drawing Sheets

METHOD, APPARATUS AND COMPUTER PROGRAM PRODUCT FOR PROCESSING STACK RELATED EXCEPTION TRAPS

BACKGROUND OF THE INVENTION

1. Field of the Invention

This invention relates to the field of computer architecture. Specifically, this invention is a method, apparatus and computer program product for reducing overflow and underflow exception traps resulting from the user of a stack file.

2. Background

Some computer architectures include a windowed register file (the register window file) that contains a set of registers. A register window is a selection of registers that are available to a program at a particular moment. Register windows are used to improve performance of subroutine calls (among other reasons). The SPARC® architecture is an example of a computer architecture that uses a register window file.

A register window file is one example of a stack file. A "stack file" consists of a stack structure that is partially stored in memory and partially stored in a register file for faster access. The "top-of-stack cache" refers to the registers of the stack file. Stack elements are moved from the registers to memory and back again based on stack underflow and overflow exception traps.

Generally, on entering a subroutine, the subroutine invokes a "save" instruction (or similar instruction). The "save" instruction provides the subroutine with a new register window. If the register window file does not contain enough registers to hold the new register window, the "save" instruction causes an overflow trap. When the register window file overflows, the registers in at least one older register window in the register window file must be saved (spilled) to memory to release registers for a new register window. In a similar manner the register window file underflows when register window file is empty and the computer executes an instruction (such as a "restore" instruction) to restore a previously saved register window.

In both of these circumstances, the computer generates a register window exception trap. This stack exception trap invokes a trap handler that executes instructions to handle the exception. For a register window overflow condition, the contents of one or more existing register windows are spilled (saved) to memory. For a register window underflow condition, the previously saved contents of one or more register windows are restored to the stack file (a fill).

Prior art operating systems spill and fill a fixed number of register windows at each register window exception trap (often the trap only affects a single register window). This is inefficient when there are deeply nested or recursive subroutine calls. Historically, a single fill or spill was considered appropriate because most traditional programming methodologies did not generate deep subroutine call chains. Modern programming methodologies (in particular object-oriented programs, and programs that use recursion) often generate deep call chains. For these programming methodologies, window exceptions would be reduced if more than one spill/fill occurred on a register window exception trap. However, the program mix on most computer systems includes some programs that use the traditional methodology and other programs that use the modern methodology. In addition, a single program often includes both methodologies. Thus, simply spilling or filling a fixed number of register windows does not improve the overall system efficiency.

The register window file is but one example of the use of a "top-of-stack cache." Another example is illustrated by the Intel® floating point unit (FPU) architecture. Yet another example is the hardware stack provided by a stack oriented computer architecture (such as a Forth Computer). Each of these hardware stacks are a form of a "top-of-stack cache" in that the top of the stack can be maintained in registers directly accessible by the CPU and the rest of the stack can be maintained in memory and that each stack can invoke an overflow trap or an underflow trap.

It would be advantageous to provide a spill/fill handler for top-of-stack caches that adapt to the characteristics of the currently executing program. This adaptation would improve the efficiency of the computer system by reducing the number of top-of-stack cache exceptions generated by the executing program.

SUMMARY OF THE INVENTION

The present invention improves the performance of a computer (that includes a top-of-stack cache) by adjusting the contents of the top-of-stack cache dependant on a predictor that contains information about the past usage of the top-of-stack cache. One aspect of the invention is a computer controlled method for minimizing exceptions in a computer having a memory and top-of-stack cache. The method initializes a predictor used to track exceptions from the top-of-stack cache. The method also invokes an exception trap that is processed dependent on the predictor. The method also changes the predictor responsive to the exception trap.

Another aspect of the invention is an apparatus, having a central processing unit (CPU) and a memory coupled to the CPU, for minimizing exceptions in a computer having a top-of-stack cache. The apparatus includes a predictor initialization mechanism that is configured to initialize a predictor for tracking exceptions from said top-of-stack cache. Additionally, the apparatus includes a trap mechanism that is configured to invoke an exception trap in the computer. The apparatus also includes a trap handler mechanism in the computer that is configured to process the exception trap dependent on the predictor. In addition, the apparatus includes a predictor maintenance mechanism that is configured to change the predictor responsive to the exception trap.

Yet a further aspect of the invention is a computer program product embodied on a computer usable medium for causing a computer, having a top-of-stack cache, to minimize exceptions. When executed on a computer, the computer readable code causes the computer to effect a predictor initialization mechanism, a trap mechanism, a trap handler mechanism and a predictor maintenance mechanism. Each of these mechanisms having the same functions as the corresponding mechanisms for the previously described apparatus.

Another aspect of the invention is a computer data signal embodied in a carrier wave having computer readable code embodied therein for causing a computer, having a top-of-stack cache, to minimize exceptions. When executed on a computer, the computer readable code causes the computer to effect a predictor initialization mechanism, a trap mechanism, a trap handler mechanism and a predictor maintenance mechanism. Each of these mechanisms having the same functions as the corresponding mechanisms for the previously described apparatus.

The foregoing and many other aspects of the present invention will become obvious to those of ordinary skill in the art after having read the following detailed description of preferred embodiments that are illustrated in the various drawing figures.

DESCRIPTION OF THE PREFERRED EMBODIMENTS

Operating Environment

One example of a computer architecture that uses a register window file is the SPARC® architecture. This architecture is defined in *The SPARC Architecture Manual: Version 9*, Weaver & Germond, © 1994 SPARC International, Inc., ISBN 0-13-099227-5. The following sections of this document are related to register window files and are incorporated by reference in their entirety: §§ 2, 3.2.7, 3.3, 5.1.1–5.1.4, 5.2.10–5.2.11, 6.3.6.1–6.3.6.4, 6.4, 7.5.2.1, A.8, A.21, A.24, A.44–46, H.

Intel® processors use a register stack for floating point operations that can be organized as a top-of-stack cache. This register stack organization is described by Chapter 7 of *Intel Architecture Software Developer's Manual: Basic Architecture*, order number 243190, (©1996, 1997, hereby incorporated by reference in its entirety.

A general register top-of-stack cache is also used in a microprocessor designed to directly execute Forth programs. This device is described by *An Architecture for the Direct Execution of the Forth Programming Language*, by Hayes, Fraeman, Williams and Zaremba, © 1987 ACM 0-89791-238-1/87/1000-0042, Proceedings Second International Conference on Architectural Support for Programming Languages and Operating Systems, October 1987, hereby incorporated by reference in its entirety.

Figure 1:
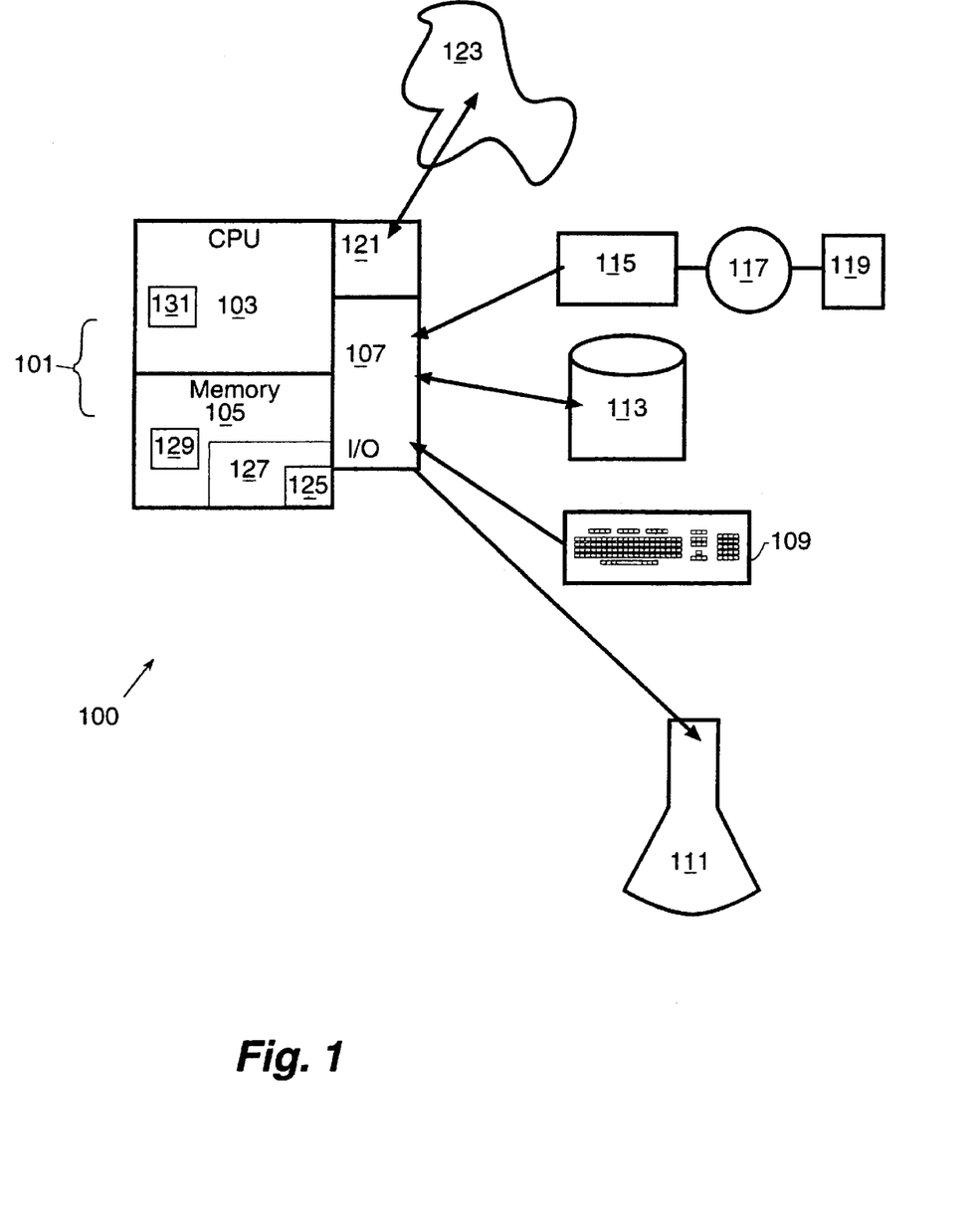
FIG. 1 illustrates a computer system capable of using the invention in accordance with a preferred embodiment.

FIG. 1 illustrates a computer, indicated by general reference character 100, that incorporates the invention. The computer 100 includes a processor 101 that incorporates a central processor unit (CPU) 103, a memory section 105 and an input/output (I/O) section 107. The I/O section 107 is connected to a keyboard 109, a display unit 111, a disk storage unit 113 and a CD-ROM drive unit 115. The CD-ROM drive unit 115 can read a CD-ROM medium 117 that typically contains a program and data 119. The CD-ROM drive unit 115 (along with the CD-ROM medium 117) and the disk storage unit 113 comprise a filestorage mechanism. Some embodiments of the invention include a network interface 121 that connects the computer 100 to a network 123. The processor 101 includes the capability of generating exception traps that are handled by a trap handler 125. The trap handler 125 is generally (although not always) part of an operating system 127 within the memory section 105. An application program 129 generally makes system calls to the operating system 127 to perform services and provide resources. The CPU 103 includes a 'top-of-stack cache' 131. In the case of computers conforming to the SPARC architecture the 'top-of-stack cache' 131 is a register file that is organized into register windows. One skilled in the art will understand that not all of the displayed features of the computer 100 need to be present to practice the invention.

Much of the invention is described with reference to the register window file of the SPARC architecture. One skilled in the art will understand how to apply the invention as described with respect to the register file to other top-of-stack cache architectures. One example architecture uses a general purpose register file that invokes a general purpose register file exception trap when the general purpose top-of-stack cache overflows or underflows. Another example architecture includes a floating point top-of-stack cache capable of generating a floating point register file exception trap when the floating point top-of-stack cache overflows or underflows.

Figure 2:
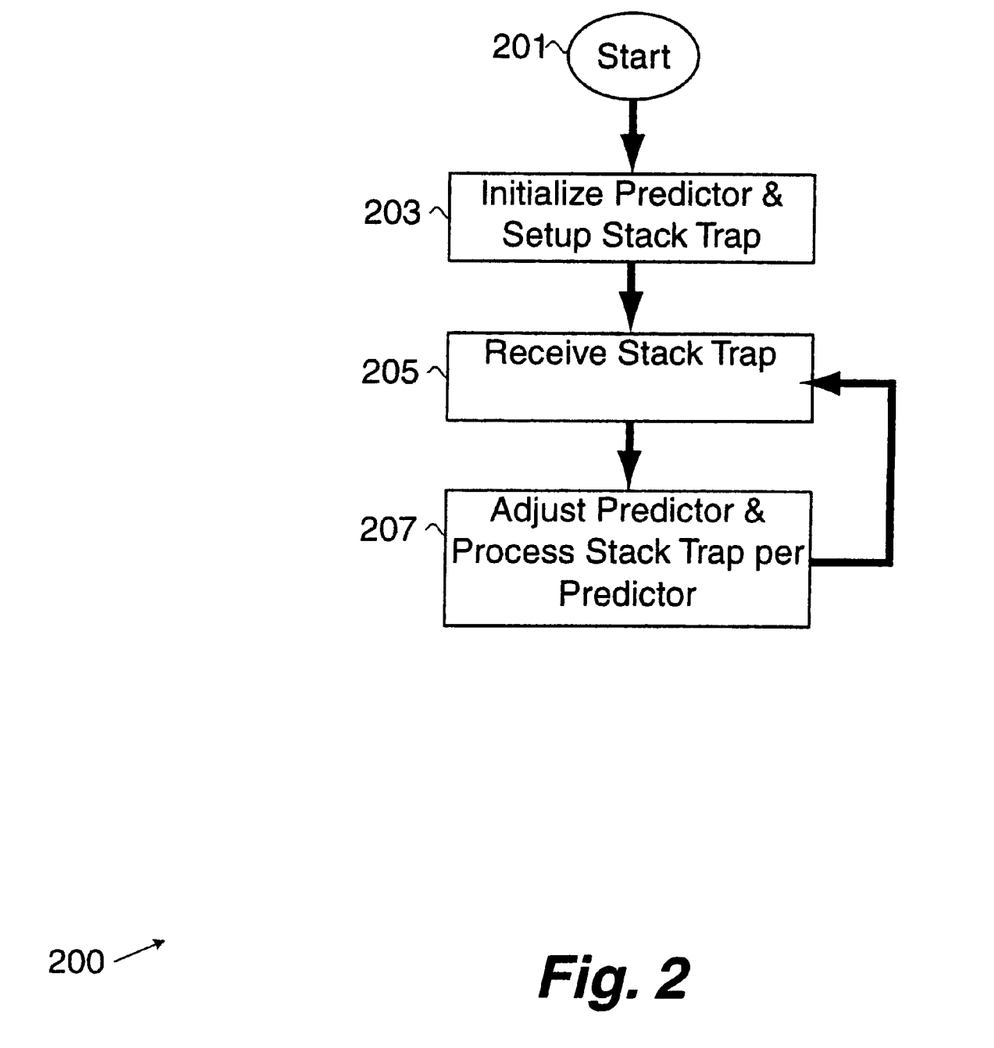
FIG. 2 illustrates an overview of the stack exception handling process in accordance with a preferred embodiment.

FIG. 2 illustrates a 'stack exception handling' process, indicated by general reference character 200, for minimizing the number of overflow and underflow exceptions. The 'stack exception handling' process 200 initiates at a 'start' terminal 201 and continues to an 'initialization' procedure 203. A procedure is any sequence of instructions that can be executed by a computer. The 'initialization' procedure 203 initializes a predictor, initializes stack element management values associated with the predictor, and initializes the top-of-stack cache overflow and underflow trap vectors.

After some period of operation the top-of-stack cache overflows (or, at a later time, the top-of-stack cache may underflow) invoking a stack exception trap through one of the trap vectors initialized by the 'initialization' procedure 203. A 'receive stack trap' event 205 receives the trap, saves the computer's state as trap information and causes the CPU 103 to execute computer instructions residing in the trap handler 125. The trap handler 125 includes a 'process stack trap' procedure 207. The 'process stack trap' procedure 207 processes the stack exception trap to spill or fill one or more stack elements (such as register windows) depending on the predictor. Next, the 'process stack trap' procedure 207 changes the predictor depending on whether the stack exception trap was caused by a stack overflow or underflow. When the next stack exception trap occurs, the 'stack exception handling' process 200 repeats starting at the 'receive stack trap' event 205. One skilled in the art will understand that the saved trap information is used to restore the computer's state (generally to re-execute the trapped instruction) when the trap returns.

One of the advantages of the invention is that it determines the number of stack elements that are to be spilled/filled dependent on the spill/fill history reflected by the value of the predictor. Thus, if more overflow traps than underflow traps have occurred, more stack elements can be spilled to memory on each overflow trap. For register window stacks the stack elements are register windows. This aspect of the invention becomes very important with modern programming methodologies that generate deep call sequences (for example, object-oriented and/or recursive programming).

The stack elements in other top-of-stack cache architectures need not be register windows. For example, the Intel FPU contains a register stack having stack elements that are floating point registers while the Forth architecture contains general purpose registers. The invention operates on these stack files to spill or fill a specified number of registers (stack elements) to or from memory at every overflow or underflow exception trap dependent on a predictor.

Figure 3A:
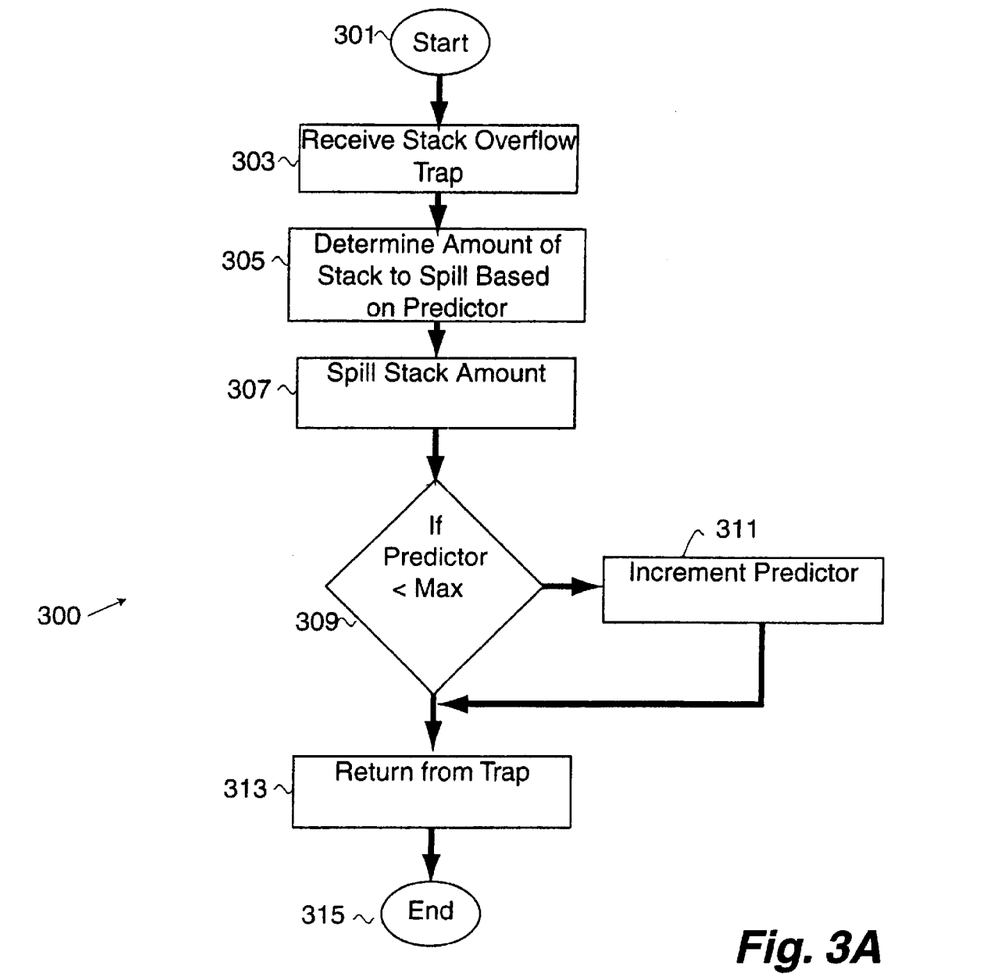
FIG. 3A illustrates the operation of a stack overflow trap handler process used in FIG. 2.

FIG. 3A illustrates a stack overflow trap handler process, indicated by general reference character 300, configured to process a stack overflow trap. One skilled in the art will understand that some computer architectures have only one trap vector associated with both register window overflow and underflow conditions. Other computer architectures have separate vectors associated with the register window underflow and overflow conditions. Still other computer architectures incorporate multiple vectors for both overflow traps and underflow traps. Regardless of the actual trap details, a stack exception trap handler similar to the stack overflow trap handler process 300 is invoked on an overflow trap. For the purposes of the following discussion, the term "stack exception trap" encompasses both a stack underflow trap and a stack overflow trap.

The stack overflow trap handler process 300 initiates at a 'start' terminal 301 after the 'initialization' procedure 203 executes. Once a stack overflow trap occurs, the stack overflow trap handler process 300 continues to a 'receive stack overflow' event 303 that is invoked as a direct or indirect result of the occurrence of a stack overflow trap. Next, the stack overflow trap handler process 300 determines how many stack elements to spill to memory based on the predictor. Because the trap is a stack overflow trap, the top-of-stack cache is full. Thus, although the stack overflow trap handler process 300 must spill at least one stack element, it can spill more than one stack element to make additional room in the top-of-stack cache. Thus, for a register window file the process can make room for anticipated execution of "save" instructions. A 'determine amount of stack to spill' procedure 305 determines how many stack elements to spill based on the predictor.

In one preferred embodiment, the predictor is a two-bit variable that is used to select a spill value from a table of stack element management values. For example, Table 1 illustrates one example of stack element management values indexed by a two-bit predictor.

TABLE 1

| Predictor | Spill | Fill |
|-----------|-------|------|
| 00 | 1 | 3 |
| 01 | 2 | 2 |
| 10 | 2 | 2 |
| 11 | 3 | 1 |

Thus, assuming that the predictor is initially set to zero, the first stack overflow trap spills only one stack element. A second or third stack overflow trap without an intervening stack underflow trap will spill two stack elements. A fourth trap (and all subsequent stack overflow traps that do not have an intervening stack underflow trap) will spill three stack elements. However, as is subsequently described, each stack underflow trap will decrement the predictor and potentially change the number of stack elements that are spilled to memory.

One skilled in the art will understand that for register window top-of-stack caches, the number of stack elements is the number of register windows to fill/spill. For other top-of-stack caches the stack element management values can determine the number of stack elements to spill from or fill to the top-of-stack cache.

Once the spill value is selected by the 'determine amount of stack to spill' procedure 305, the stack overflow trap handler process 300 continues to a 'spill stack amount' procedure 307 that spills the number of register windows to memory specified by the spill value.

Next, the stack overflow trap handler process 300 continues to a 'predictor less than maximum' decision procedure 309 that determines whether the predictor is less than its maximum. If so, the stack overflow trap handler process 300 continues to an 'increment predictor' procedure 311 that changes the predictor so that the next stack exception trap will use the larger predictor. Once the predictor is incremented, or if the predictor is already at its maximum, the stack overflow trap handler process 300 continues to a 'return from trap' procedure 313. The 'return from trap' procedure 313 returns to the program that attempted to execute an instruction that caused the stack overflow. In the case of a register file, this instruction is a "save" instruction. Thus, the 'return from trap' procedure 313 re-executes the "save" instruction. Because the top-of-stack cache now has room for a register window, the "save" instruction succeeds and the program continues execution. The stack overflow trap handler process 300 then completes through an 'end' terminal 315.

One skilled in the art will understand that the predictor can be of any size, from a single bit to many bits depending on the amount of information needed to anticipate the next stack exception trap. Further, one skilled in the art will understand that the invention need not decrement or increment the predictor. Instead, one preferred embodiment stores a state value in the predictor and changes the state value dependent on the existing state and whether an overflow or underflow trap occurs.

Figure 3B:
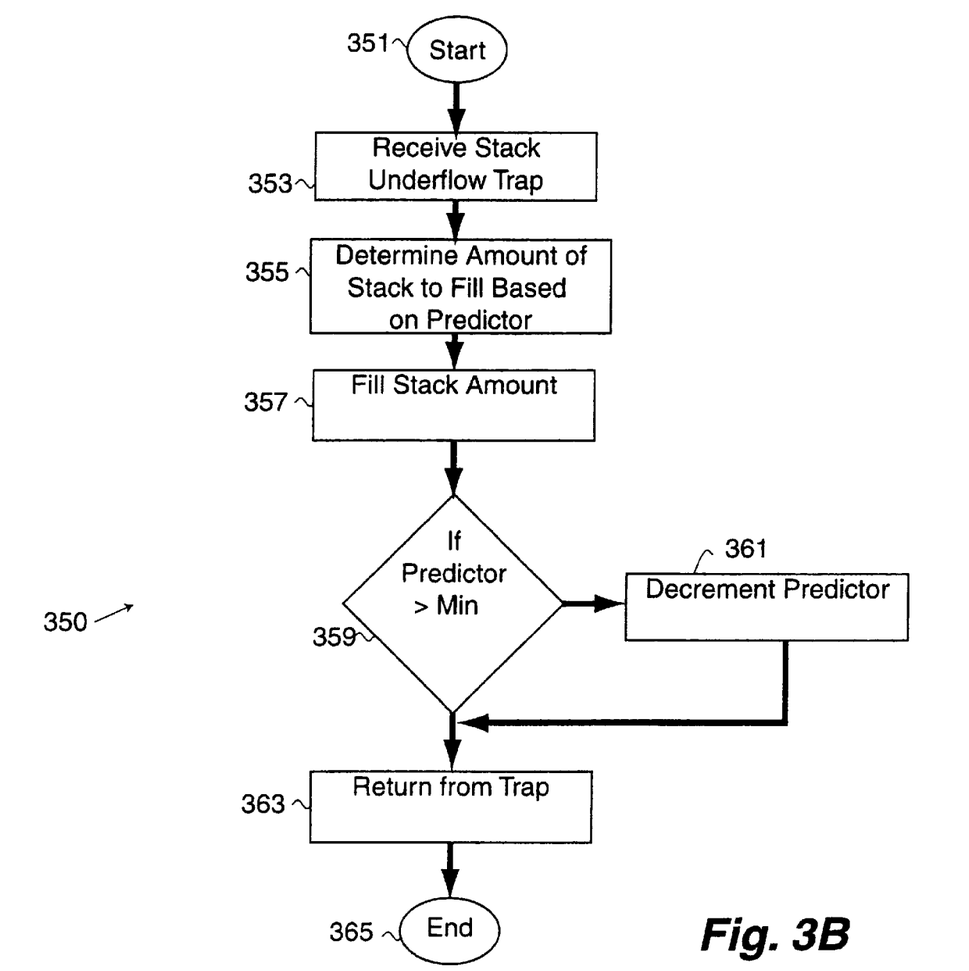
FIG. 3B illustrates the operation of a stack underflow trap handler process used in FIG. 2.

FIG. 3B illustrates a stack underflow trap handler process, indicated by general reference character 350 configured to process a stack underflow trap. As previously described with respect to FIG. 3A, there are many ways to invoke the stack underflow trap handler process 350. The stack underflow trap handler process 350 initiates at a 'start' terminal 351 after the 'initialization' procedure 203 executes. Once a stack underflow trap occurs, the stack underflow trap handler process 350 continues to a 'receive stack underflow' event 353 that is invoked as a direct or indirect result of the occurrence of a stack underflow trap. Next, the stack underflow trap handler process 350 continues to a 'determine amount of stack to fill' procedure 355 that determines how many register windows to fill from memory based on the predictor.

As was previously described, in one preferred embodiment, the predictor is a two-bit variable that is used to select a fill value from a table of stack element management values similar to that shown in Table 1. Because the trap is a stack underflow trap, the top-of-stack cache is empty. Thus, although the stack underflow trap handler process 350 must fill at least one stack element, it can fill more than one stack element to preload the top-of-stack cache. In the case of a register window, the register file can be filled in anticipation of the execution of more "restore" instructions than "save" instructions.

Once the fill value is selected by the 'determine amount of stack to fill' procedure 355, the stack underflow trap handler process 350 continues to a 'fill stack amount' procedure 357 that fills the number of stack elements from memory specified by the fill value.

Next, the stack underflow trap handler process 350 continues to a 'predictor greater than minimum' decision procedure 359 that determines whether the predictor is greater than its minimum value. If so, the stack underflow trap handler process 350 continues to a 'decrement predictor' procedure 361 that decrements the predictor so that the next stack exception trap will use the new predictor. Once the predictor is decremented, or if the predictor is already at its minimum, the stack underflow trap handler process 350 continues to a 'return from trap' procedure 363. In the case of a register window underflow trap, the trap returns to the program that attempted to execute a "restore" instruction and re-executes the "restore" instruction. Because the register file now contains a register window, the "restore" instruction succeeds and the program continues execution. The stack underflow trap handler process 350 then completes through an 'end' terminal 365.

In one embodiment the stack overflow trap handler process 300 and the stack underflow trap handler process 350 reside within the operating system and execute in a privileged environment. In another embodiment, the stack overflow trap handler process 300 and the stack underflow trap handler process 350 reside in an application and execute within a protected environment. In this case, the trap is generally first vectored to program instructions in the operating system that re-directs the trap to execute the register window handlers in the application.

One skilled in the art will understand that the stack element management values indicated in Table 1 are only one possible set of values. The optimum set of values will depend on the number of stack elements in the top-of-stack cache and the characteristics of the types of programs that are executed by the computer. Such a one will also understand that the predictor represents a state. Thus, the invention contemplates storing particular values in the predictor instead of incrementing or decrementing the predictor.

Figure 4:
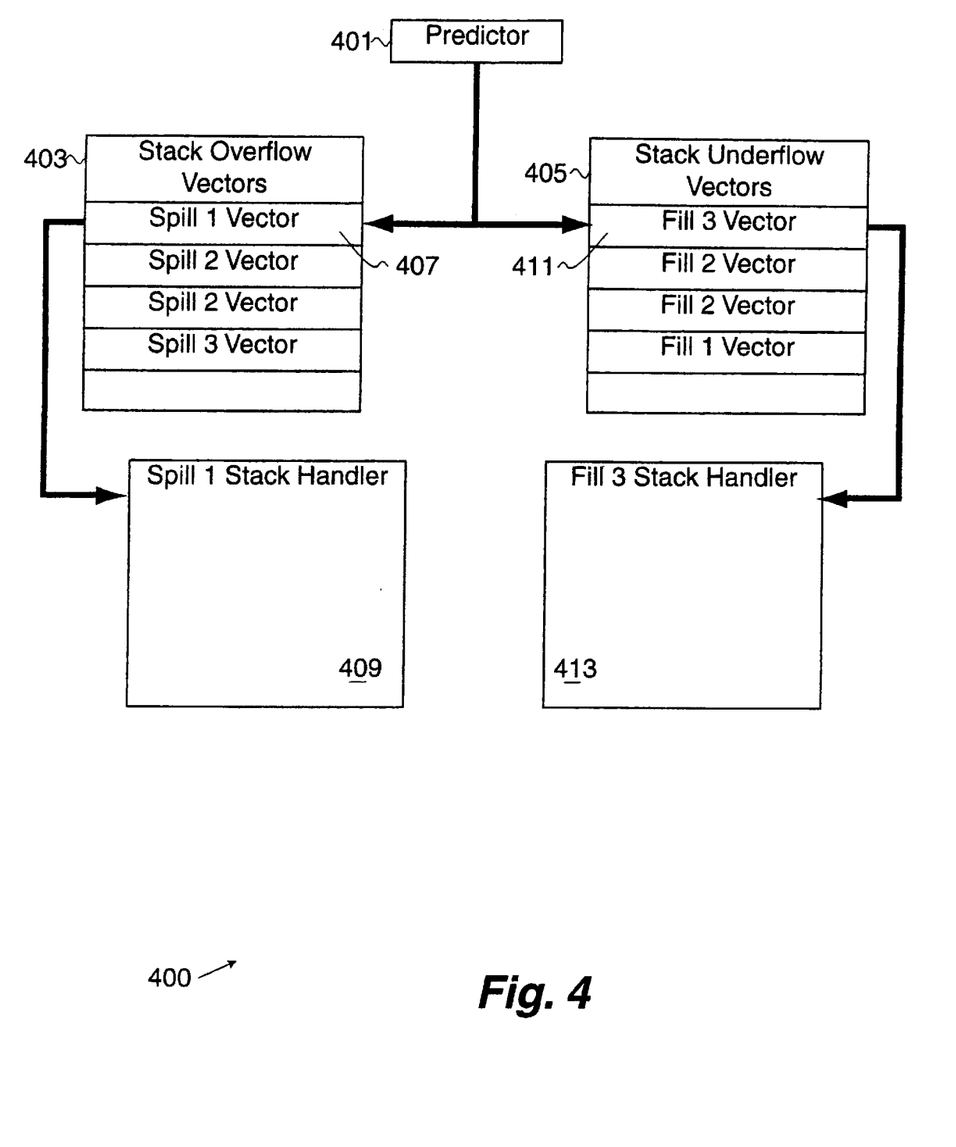
FIG. 4 illustrates a predictor dependent vector in accordance with a preferred embodiment.

FIG. 4 illustrates a stack exception trap vector architecture, indicated by general reference character 400 that can be used to effectuate a preferred embodiment. A predictor register 401 contains the value of the predictor. The value contained in the predictor register 401 is used to select which overflow vector, in a stack overflow vector array 403, and which underflow vector, in a stack underflow vector array 405, to use when a stack exception trap occurs. For example, the current value in the predictor register 401 selects a selected overflow vector 407 on an overflow exception. The selected overflow vector 407 causes the computer to execute instructions in a 'spill 1 stack element' handler 409. The 'spill 1 stack element' handler 409 contains instructions that spill one stack element (for example, a single register or one register window) and that increment the value in the predictor register 401 (up to a maximum). However, the current value in the predictor register 401 also specifies a selected underflow vector 411 that causes the computer to execute instructions in a 'fill 3 stack elements' handler 413. The 'fill 3 stack elements' handler 413 contains instructions that will fill three stack elements and that decrements the value in the predictor register 401 (down to a minimum). Thus, as the value in the predictor register 401 changes (due to stack exception traps) different spill/fill handlers are selected by specifying which trap vectors in the vector arrays are selected.

Figure 5:
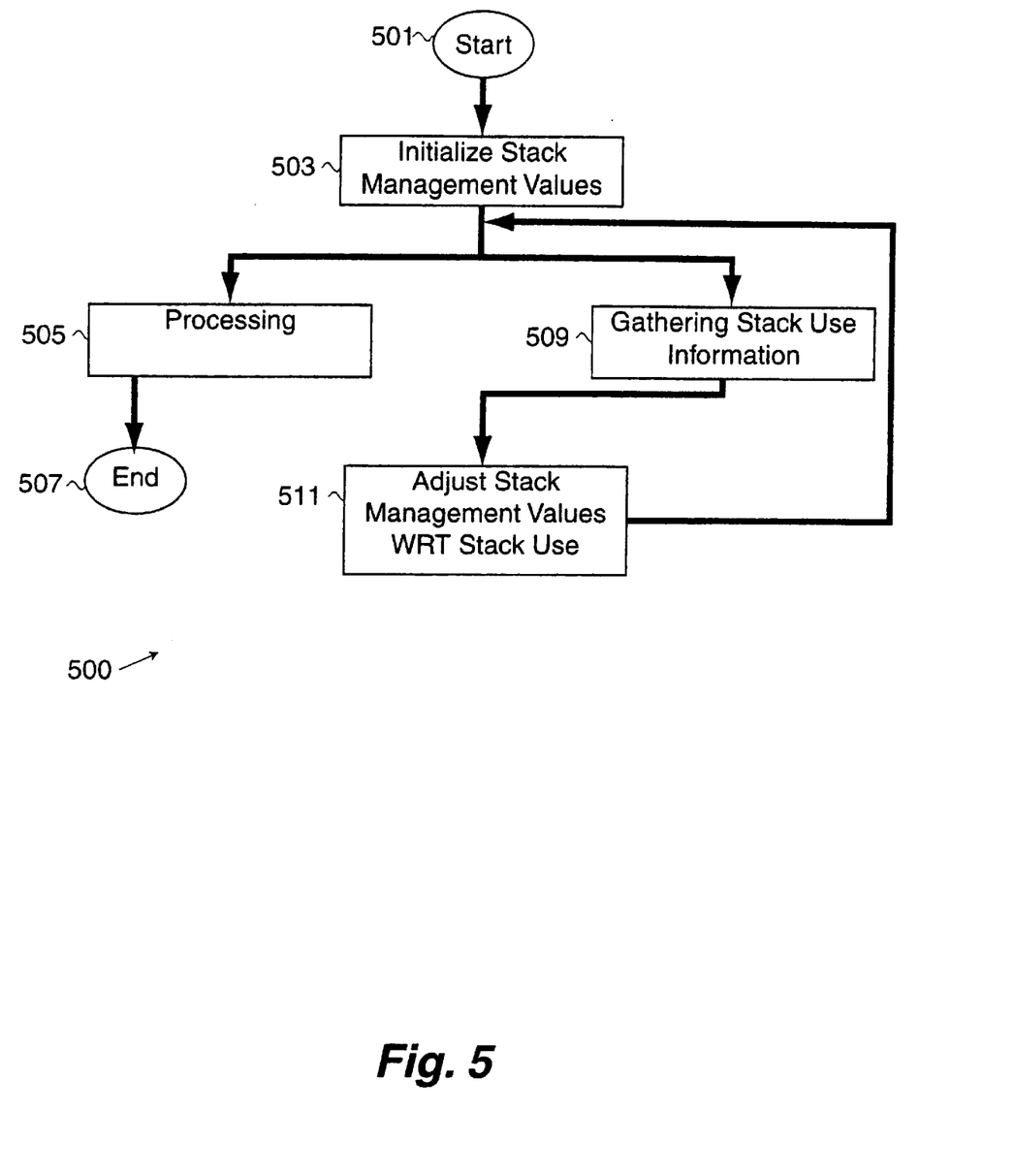
FIG. 5 illustrates an 'adaptive stack use adjustment' process in accordance with a preferred embodiment.

FIG. 5 illustrates an 'adaptive stack use adjustment' process, indicated by general reference character 500, for adaptively changing the stack element management values responsive to information gathered about the performance characteristics of a particular executing program.

The 'adaptive stack use adjustment' process 500 initiates at a 'start' terminal 501 and continues to an 'initialize stack element management value' procedure 503. The 'initialize stack element management value' procedure 503 initializes the stack element management values associated with the predictor. This initialization can be accomplished (without limitation) once when the operating system boots, when a new application program process is initiated, or whenever the application program intends to reset the stack element management values. Once the stack element management values are initialized, the 'adaptive stack use adjustment' process 500 continues to a 'processing' procedure 505 that performs the steps involved to effectuate the program's purpose. When the processing is complete, the 'adaptive stack use adjustment' process 500 completes through an 'end' terminal 507. However, after the 'initialize stack element management value' procedure 503 and during the execution of the 'processing' procedure 505 a 'gather stack use information' procedure 509 also executes. The 'gather stack use information' procedure 509 gathers stack use information resulting from the execution of the 'processing' procedure 505. The stack use information is used by an 'adjust stack element management value' procedure 511 to adjust the stack element management values to optimize the stack file fill/spill characteristics during the execution of the 'processing' procedure 505. The stack element management values can be adjusted through an operating system service invocation or other technique suited to changing these values dependent on the specific characteristics of an embodiment.

Figure 6A:
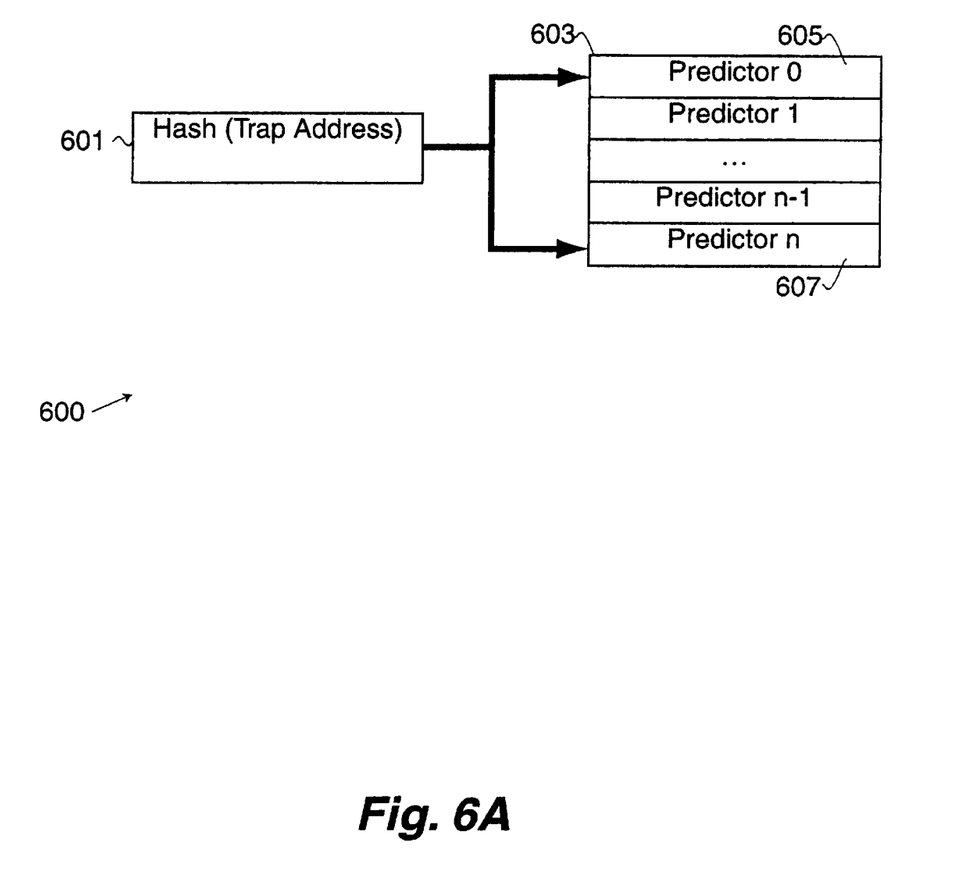
FIG. 6A illustrates a hash mechanism used in accordance with a preferred embodiment.

Another aspect of the invention provides multiple predictors as a function of the address of the instructions that invoke a stack exception trap. FIG. 6A illustrates a hash mechanism, as indicated by general reference character 600, that selects a predictor as a function of the address of the instruction that caused a stack exception trap. The hash mechanism 600 includes a 'hash index generation' procedure 601, which is subsequently described with respect to FIG. 6B, and a hash table 603. The 'hash index generation' procedure 601 takes as input the address in memory of the instruction that caused the stack exception trap (for example, in the case of a register window file, the "save" or "restore" instruction that caused the stack exception trap). Using well known methods, the address is hashed to generate an index to an entry in the hash table 603. The hash table 603 contains a first predictor entry 605 and an $n^{th}$ predictor entry 607. The first predictor entry 605 through the $n^{th}$ predictor entry 607 comprise a set of predictor entries. Each predictor entry in the hash able 603 can contain the predictor value itself, a pointer to the appropriate predictor value, or other value used to specify a predictor. One skilled in the art will understand that the use of the hash mechanism 600 allows multiple predictors to separately control the spill/fill of the stack file dependant on where in memory the overflow and underflow exceptions occur. Such a one will also understand that the hash mechanism is but one possible way of using information saved by the trap to direct the selection of a predictor.

Figure 6B:
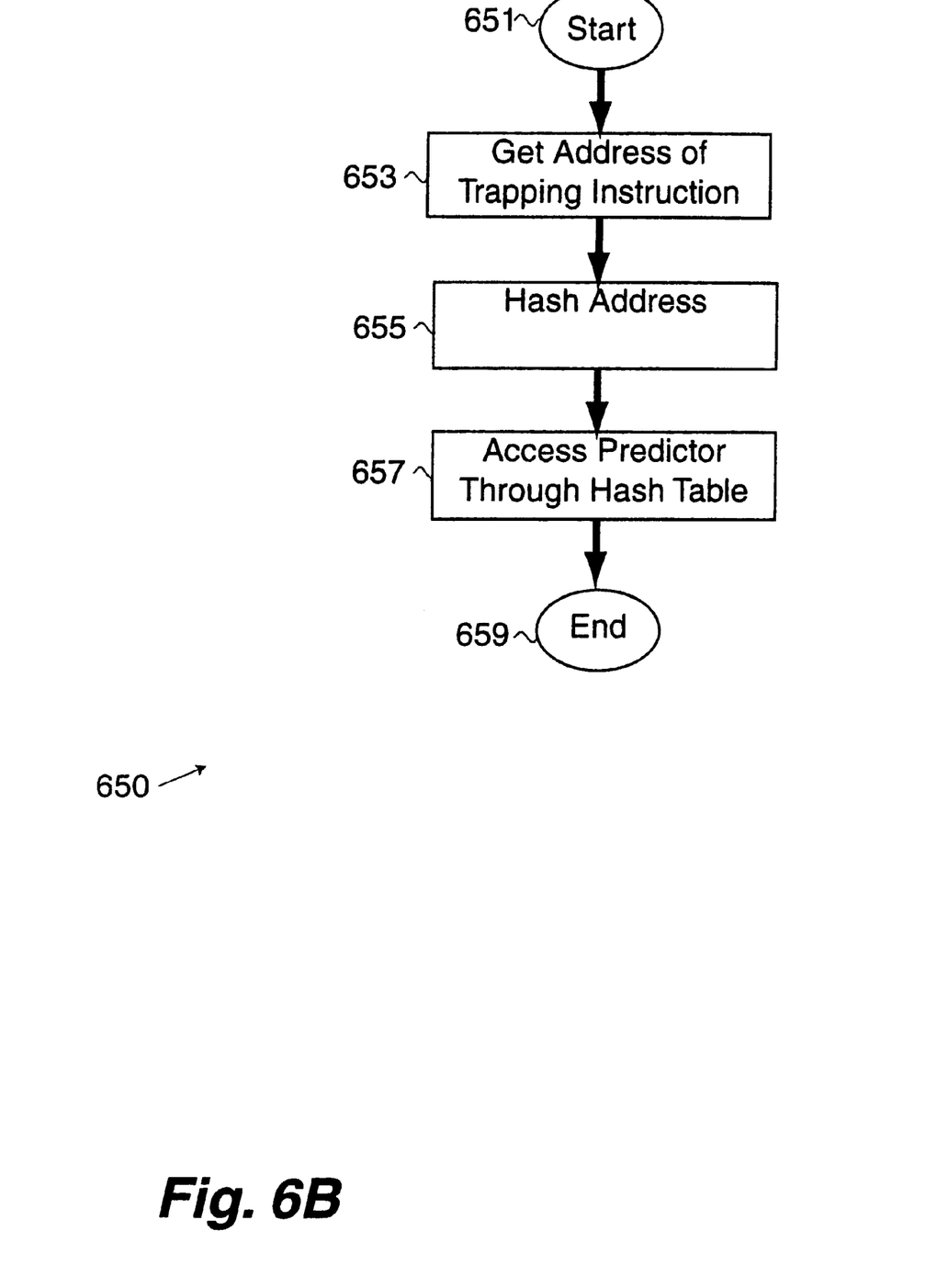
FIG. 6B illustrates a predictor selection process used in accordance with a preferred embodiment.

FIG. 6B illustrates a predictor selection process, as indicated by general reference character 650, for accessing a predictor from the hash table 603 of FIG. 6A. The predictor selection process 650 is invoked by the 'hash index generation' procedure 601 and initiates at a 'start' terminal 651. Next, a 'get address of trapping instruction' procedure 653 accesses the information saved as a result of the stack exception trap to obtain the address of the instruction that caused the trap. Next, a 'hash address' procedure 655 uses well understood techniques to generate an appropriate index into the hash table 603 based on the address obtained from the 'get address of trapping instruction' procedure 653. Next, an 'access predictor' procedure 657 uses the contents of the hash table 603 as (or to obtain) the predictor. Once the predictor (or a pointer to the predictor) is selected, the previously described processes can operate on the predictor and appropriately spill/fill the stack file. The predictor selection process 650 completes through an 'end' terminal 659.

One skilled in the art will understand that the invention improves the performance of computer systems having a stack file (or other top-of-stack cache) by reducing the number of stack exception traps resulting from the execution of a program.

Although the present invention has been described in terms of presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for minimizing exceptions in a computer having a memory and a top-of-stack cache, said method comprising the steps of:
   (a) initializing a predictor for tracking exceptions from said top-of-stack cache;
   (b) invoking an exception trap;
   (c) processing said exception trap dependent on said predictor; and
   (d) changing said predictor responsive to said exception trap.

2. The computer controlled method of claim 1 wherein said predictor is associated with at least one stack element management value that includes a fill value, the stack exception trap is a stack underflow trap, said stack file is organized into a plurality of stack elements and step (c) further comprises:
   (c1) determining said fill value dependant on said predictor, said fill value used to specify how many of said plurality of stack elements are to be filled; and
   (c2) filling at least one of said plurality of stack elements dependant on said fill value.

3. The computer controlled method of claim 2 wherein step (c2) fills at least one of said plurality of stack elements from said memory.

4. The computer controlled method of claim 1 wherein said predictor is associated with at least one stack element management value that includes a spill value, the stack exception trap is a stack overflow trap, said stack file is organized into a plurality of stack elements and step (c) further comprises:
   (c1) determining said spill value dependant on said predictor, said spill value used to specify how many of said plurality of stack elements are to be spilled; and
   (c2) spilling to said memory at least one of said plurality of stack elements dependant on said spill value.

5. The computer controlled method of claim 1 wherein said predictor is associated with at least one stack element management value and said method further comprises:
   (e) adjusting said at least one stack element management value.

6. The computer controlled method of claim 5 wherein step (e) is responsive to stack use information.

7. The computer controlled method of claim 1 wherein said stack exception trap uses a trap vector within a trap vector array and step (c) further comprises:
   (c1) selecting said trap vector in said trap vector array dependant on said predictor.

8. The computer controlled method of claim 1 wherein said computer executes an application program and step (c) is performed within said application program.

9. The computer controlled method of claim 1 further comprising:
   (e) selecting said predictor from a set of predictor entries.

10. The computer controlled method of claim 9 wherein step (e) comprises:
    (e1) accessing trap information saved by said exception trap; and
    (e2) selecting said predictor from said set of predictor entries, said selection based on said trap information.

11. The computer controlled method of claim 1 wherein said top-of-stack cache is a general purpose register file and said exception trap is a general purpose register file exception trap.

12. The computer controlled method of claim 1 wherein said top-of-stack cache is a register window file and said exception trap is a register window stack exception trap.

13. The computer controlled method of claim 1 wherein said top-of-stack cache a floating point register file and said exception trap is a floating point register stack exception trap.

14. An apparatus having a central processing unit (CPU) and a memory coupled to said CPU for minimizing exceptions in a computer having a top-of-stack cache, said apparatus comprises:
    a predictor initialization mechanism configured to initialize a predictor for tracking exceptions from said top-of-stack cache;
    a trap mechanism configured to invoke an exception trap in said computer;
    a trap handler mechanism, in said computer, configured to process said exception trap dependent on said predictor; and
    a predictor maintenance mechanism configured to change said predictor responsive to said exception trap.

15. The apparatus of claim 14 wherein said predictor is associated with at least one stack element management value that includes a fill value, the stack exception trap is a stack underflow trap, said stack file is organized into a plurality of stack elements and the trap handler mechanism further comprises:
    a fill determination mechanism configured to determine said fill value dependant on said predictor, said fill value used to specify how many of said plurality of stack elements are to be filled; and
    a fill mechanism configured to fill at least one of said plurality of stack elements dependant on said fill value.

16. The apparatus of claim 15 wherein the fill mechanism fills at least one of said plurality of stack elements from said memory.

17. The apparatus of claim 14 wherein said predictor is associated with at least one stack element management value that includes a spill value, the stack exception trap is a stack overflow trap, said stack file is organized into a plurality of stack elements and the trap handler mechanism further comprises:
    a spill determination mechanism configured to determine said spill value dependant on said predictor, said spill value used to specify how many of said plurality of stack elements are to be spilled; and
    a spill mechanism configured to spill to said memory at least one of said plurality of stack elements dependant on said spill value.

18. The apparatus of claim 14 wherein said predictor is associated with at least one stack element management value and said apparatus further comprises:

a adjustment mechanism configured to adjust said at least one stack element management value.

19. The apparatus of claim 18 wherein the adjustment mechanism is responsive to stack use information.

20. The apparatus of claim 14 wherein said stack exception trap uses a trap vector within a trap vector array and the trap handler mechanism further comprises:

a trap vector selection mechanism configured to select said trap vector in said trap vector array dependant on said predictor.

21. The apparatus of claim 14 wherein said computer executes an application program and the trap handler mechanism is configured within said application program executing in said computer.

22. The apparatus of claim 14 wherein said top-of-stack cache is a general purpose register file and said exception trap is a general purpose register file exception trap.

23. The apparatus of claim 14 wherein said top-of-stack cache is a floating point register stack and said exception trap is a floating point register stack exception trap.

24. The apparatus of claim 14 wherein said top-of-stack cache is a register window file, and said exception trap is a register stack exception trap.

25. The apparatus of claim 14 further comprising:

a predictor selection mechanism configured to select said predictor from a set of predictor entries.

26. The apparatus of claim 25 wherein the predictor selection mechanism comprises:

a trap information access mechanism configured to access trap information saved by said exception trap; and a directed selection mechanism configured to select said predictor from said set of predictor entries using said trap information.

27. A computer program product comprising:

a computer usable storage medium having computer readable code embodied therein for causing a computer to minimize exceptions, said computer having a top-of-stack cache, said computer readable code comprising:

computer readable program code configured to cause said computer to effect a predictor initialization mechanism configured to initialize a predictor for tracking exceptions from said top-of-stack cache;

computer readable program code configured to cause said computer to effect a trap mechanism configured to invoke an exception trap in said computer;

computer readable program code configured to cause said computer to effect a trap handler mechanism, in said computer, configured to process said exception trap dependent on said predictor; and computer readable program code configured to cause said computer to effect a predictor maintenance mechanism configured to change said predictor responsive to said exception trap.

28. The computer program product of claim 27 wherein said predictor is associated with at least one stack element management value that includes a fill value, the stack exception trap is a stack underflow trap, said stack file is organized into a plurality of stack elements and the trap handler mechanism further comprises:

computer readable program code configured to cause said computer to effect a fill determination mechanism configured to determine said fill value dependant on said predictor, said fill value used to specify how many of said plurality of stack elements are to be filled; and computer readable program code configured to cause said computer to effect a fill mechanism configured to fill at least one of said plurality of stack elements dependant on said fill value.

29. The computer program product of claim 27 wherein said predictor is associated with at least one stack element management value that includes a spill value, the stack exception trap is a stack overflow trap, said stack file is organized into a plurality of stack elements and the trap handler mechanism further comprises:

computer readable program code configured to cause said computer to effect a spill determination mechanism configured to determine said spill value dependant on said predictor, said spill value used to specify how many of said plurality of stack elements are to be spilled; and computer readable program code configured to cause said computer to effect a spill mechanism configured to spill to said memory at least one of said plurality of stack elements dependant on said spill value.

30. The computer program product of claim 27 wherein said predictor is associated with at least one stack element management value and said product further comprises:

computer readable program code configured to cause said computer to effect an adjustment mechanism configured to adjust said at least one stack element management value.

31. The computer program product of claim 27 wherein said stack exception trap uses a trap vector within a trap vector array and the trap handler mechanism further comprises:

computer readable program code configured to cause said computer to effect a trap vector selection mechanism configured to select said trap vector in said trap vector array dependant on said predictor.

32. The computer program product of claim 27 wherein said computer executes an application program and the trap handler mechanism is configured within said application program executing in said computer.

33. The computer program product of claim 27 further comprising:

computer readable program code configured to cause said computer to effect a predictor selection mechanism configured to select said predictor from a set of predictor entries.

34. The computer program product of claim 33 wherein the predictor selection mechanism comprises:

computer readable program code configured to cause said computer to effect a trap information access mechanism configured to access trap information saved by said exception trap; and computer readable program code configured to cause said computer to effect a directed selection mechanism configured to select said predictor from said set of predictor entries using said trap information.

35. A computer program product comprising:

a computer data signal embodied in a carrier wave having computer readable code embodied therein for causing a computer to minimize exceptions, said computer having a top-of-stack cache, said computer readable code comprising:

computer readable program code configured to cause said computer to effect a predictor initialization mechanism configured to initialize a predictor for tracking exceptions from said top-of-stack cache;

computer readable program code configured to cause said computer to effect a trap mechanism configured to invoke an exception trap in said computer;

computer readable program code configured to cause said computer to effect a trap handler mechanism, in said computer, configured to process said exception trap dependent on a predictor; and computer readable program code configured to cause said computer to effect a predictor maintenance mechanism configured to change said predictor responsive to said exception trap.

* * * * *